United States Patent
Scheurich

(10) Patent No.: US 9,808,979 B2
(45) Date of Patent: Nov. 7, 2017

(54) METHOD AND DEVICE FOR MAKING GRANULES

(71) Applicant: AUTOMATIK PLASTICS MACHINERY GMBH, Grossostheim (DE)

(72) Inventor: Jochen Scheurich, Niedernberg (DE)

(73) Assignee: Maag Automatik GmbH, Grossostheim (DE)

( * ) Notice: Subject to any disclaimer, the term of this patent is extended or adjusted under 35 U.S.C. 154(b) by 569 days.

(21) Appl. No.: 14/147,808

(22) Filed: Jan. 6, 2014

(65) Prior Publication Data

US 2014/0117580 A1   May 1, 2014

Related U.S. Application Data

(63) Continuation of application No. PCT/EP2012/002833, filed on Jul. 5, 2012.

(51) Int. Cl.
| | |
|---|---|
| *B29C 47/08* | (2006.01) |
| *B29B 9/06* | (2006.01) |
| *B29B 9/14* | (2006.01) |
| *B29C 47/00* | (2006.01) |

(52) U.S. Cl.
CPC ............ *B29C 47/0883* (2013.01); *B29B 9/06* (2013.01); *B29B 9/14* (2013.01); *B29C 47/0011* (2013.01)

(58) Field of Classification Search
CPC .......... B29C 47/0883; B29B 9/14; B29B 9/06
USPC ........... 264/143; 425/376.1, 378.1, 308, 72.1
See application file for complete search history.

(56) References Cited

U.S. PATENT DOCUMENTS

| | | | | |
|---|---|---|---|---|
| 3,502,763 A | * | 3/1970 | Ludwig ................ | A24D 3/0237 264/103 |
| 4,025,252 A | * | 5/1977 | Hunke ...................... | B29B 9/06 425/308 |
| 4,632,752 A | * | 12/1986 | Hunke ...................... | B29B 9/06 210/173 |
| 5,118,270 A | * | 6/1992 | Keilert ..................... | B29B 9/06 425/308 |

(Continued)

FOREIGN PATENT DOCUMENTS

| | | |
|---|---|---|
| DE | 102006058811 A1 | 6/2008 |
| DE | 102009059306 A1 | 6/2011 |

(Continued)

*Primary Examiner* — Nahida Sultana
(74) *Attorney, Agent, or Firm* — Buskop Law Group, P.C.; Wendy Buskop

(57) ABSTRACT

The invention relates to a method for making granules from strands of a melt of a thermoplastic polymer material having the steps of creating and providing the melt of the material, discharging the material in multiple strands from a perforated plate, impinging the strands with an impinging flow fluid from an impinging flow nozzle, cooling the strands and dividing the strands into individual granules, wherein the strands are impinged by the impinging flow fluid only during discharge from the perforated plate, and wherein, as it is discharged from the impinging flow nozzle, the impinging flow fluid has a temperature above the melting temperature of the material and has a discharge velocity in the range from 50 m/sec to 300 m/sec; the invention also relates to a device for carrying out the method with an impinging flow device that can be pivoted by means of a pivoting joint.

5 Claims, 1 Drawing Sheet

(56) References Cited

U.S. PATENT DOCUMENTS

| | | | | |
|---|---|---|---|---|
| 5,242,289 A | * | 9/1993 | Forgash | B29B 9/06 165/138 |
| 5,474,435 A | * | 12/1995 | Hunke | B29B 9/06 264/143 |
| 5,585,052 A | * | 12/1996 | Chau | D01F 6/74 264/143 |
| 5,814,350 A | * | 9/1998 | Rockstedt | B29B 9/06 264/142 |
| 5,868,982 A | * | 2/1999 | Strait | C03B 37/14 264/115 |
| 8,969,750 B2 | * | 3/2015 | Braun | B23K 11/314 219/86.33 |
| 2005/0056961 A1 | * | 3/2005 | Bonner | B29B 9/06 264/143 |
| 2005/0206029 A1 | * | 9/2005 | Moore, Jr. | B29B 17/0042 264/143 |
| 2012/0126466 A1 | | 5/2012 | Tajiri | |
| 2014/0057010 A1 | * | 2/2014 | Rubbelke | B29C 47/0021 425/72.1 |
| 2014/0103564 A1 | * | 4/2014 | Deiss | B29B 9/06 264/143 |

FOREIGN PATENT DOCUMENTS

| | | |
|---|---|---|
| WO | 2009091073 A1 | 7/2009 |
| WO | 2010140310 A1 | 12/2010 |

* cited by examiner

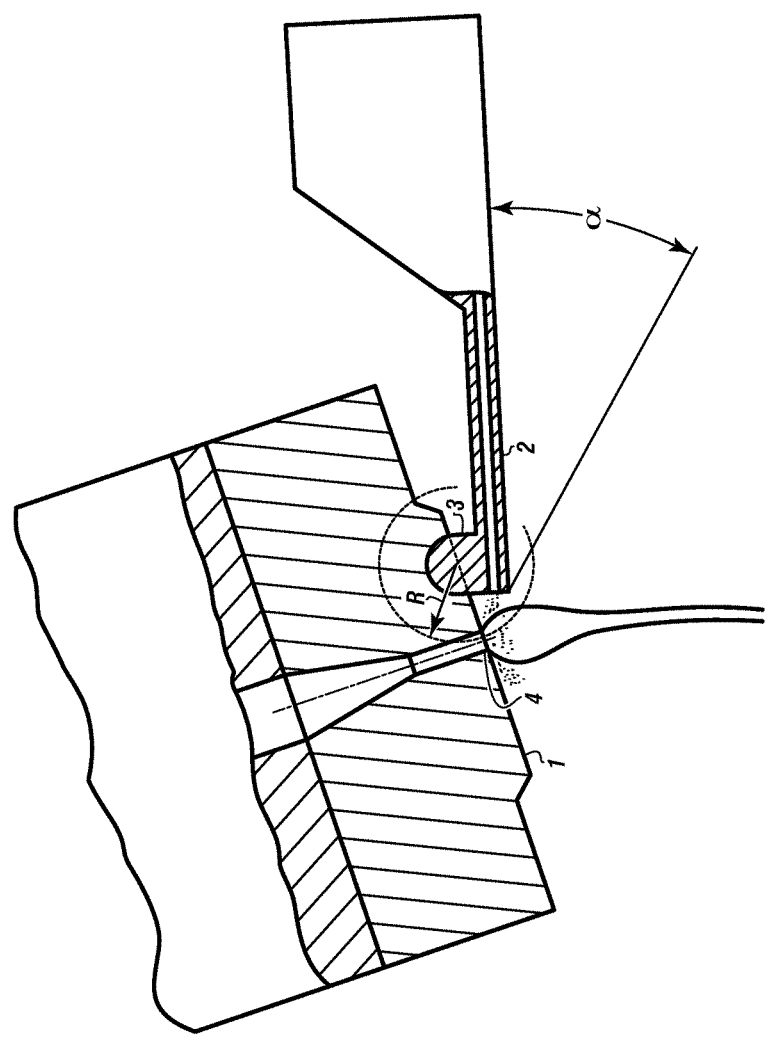

METHOD AND DEVICE FOR MAKING GRANULES

CROSS REFERENCE TO RELATED APPLICATIONS

The present patent application is a Continuation Application that claims priority to and the benefit of co-pending International Patent Application No. PCT/EP2012/002833, filed May 7, 2012, entitled "METHOD AND DEVICE FOR MAKING GRANULES," which claims priority to DE Application No. 102011106709.8 filed Jul. 6, 2011, entitled "METHOD AND DEVICE FOR MAKING GRANULES." These references are incorporated in their entirety herein.

FIELD

The present embodiments generally relate to a method and a device for making granules from a melt.

BACKGROUND

In general, in order to granulate thermoplastic polymer material such as polyamide, which may be glass-fiber reinforced for example, granulating devices are oftentimes used in which, after creation and provision of a melt of thermoplastic polymer material, strands of the melt of the thermoplastic polymer material are discharged in multiple strands from a perforated plate or from the nozzle apertures therein.

The strands thus produced are cooled, and the strands are then divided into individual granules. Corresponding devices are known as strand granulating systems, for example from the firm Automatik Plastics Machinery GmbH.

In such devices and methods, hardening and clumping of the melt can occur, especially in the region where the melt is discharged from the perforated plate, resulting in breakage of the strands. In addition, unwanted deposits can form in the vicinity of the nozzle apertures and disrupt strand discharge.

Consequently, a need exists for a method and a device for making granules from a melt that overcome the disadvantages of the prior art. In particular, to provide a method and/or a device that are simple in design, economical, and which can easily and reliably prevent deposition of material, thereby preventing clumping and/or breakage of melt strands and allowing for production of granules that is reliable and trouble-free.

The present embodiments meet these needs.

BRIEF DESCRIPTION OF THE DRAWINGS

The detailed description will be better understood in conjunction with the accompanying drawings as follows:

FIG. 1 schematically shows a partially sectional view of an embodiment of the device according to the invention.

The present embodiments are detailed below with reference to the listed FIGURES.

DETAILED DESCRIPTION OF THE EMBODIMENTS

Before explaining the present method and device in detail, it is to be understood that the method and device are not limited to the particular embodiments and that they can be practiced or carried out in various ways. Specific structural and functional details disclosed herein are not to be interpreted as limiting, but merely as a basis of the claims and as a representative basis for teaching persons having ordinary skill in the art to variously employ the present invention.

The present invention relates to a method and a device for making granules. The object of the invention is attained by a method for making granules with the features as described below, and a device for implementing the method.

The method is used for making granules from strands of a melt of a thermoplastic polymer material and has the following steps: creating and providing the melt of the thermoplastic polymer material, discharging the thermoplastic polymer material in multiple strands from a perforated plate, impinging the strands with an impinging flow fluid from an impinging flow nozzle, cooling the strands, and dividing the strands into individual granules.

The strands are only impinged by the impinging flow fluid during discharge from the perforated plate, wherein, as it is discharged from the impinging flow nozzle, the impinging flow fluid has a temperature above the melting temperature of the polymer material and has a discharge velocity in the range from 50 m/sec to 300 m/sec.

Preferably, the impinging flow fluid can have a discharge velocity in the range from 100 m/sec to 250 m/sec, more preferably in the range from 150 m/sec to 200 m/sec.

The impinging flow is targeted and sufficiently strong enough to remove or avoid formation of deposits, but gentle enough to avoid breaking strands of melt material. It is possible, therefore, that unwanted deposits can be purposefully avoided or removed mechanically by the impinging flow fluid in a simple manner.

In embodiments of the method, the impinging flow fluid can discharge in a volume of 1.5 $m^3$/h to 9 $m^3$/h, preferably in a volume of 2 $m^3$/h to 8 $m^3$/h, more preferably in a volume of 5 $m^3$/h to 7 $m^3$/h, per 100 mm width of the impinging flow nozzle. The impinging flow nozzle can have a gap height such as 0.5 mm to permit efficient impinging without excessively strong impingement flow, which could undesirably result the melt strands parting.

In embodiments, the temperature of the impinging flow fluid lies in the range from 10° C. to 120° C., preferably in the range from 50° C. to 80° C., above the melting temperature of the polymer material.

The higher temperature of the impinging fluid alone helps to prevent clumping and deposition of the melt material near the perforated plate and also helps to remove deposits that build up near the perforated plate in an especially efficient manner.

The strands of melt material can subsequently be placed on the surface of a conveyor belt, for example, and be effectively cooled and hardened before being divided into granules.

In embodiments, the position of the impinging flow nozzle relative to the strands discharging from the perforated plate can be adjustable by pivoting the impinging flow nozzle with respect to the perforated plate. This can be accomplished by means of a pivoting joint in such a manner that the flow of the fluid impinging on the region where the strands are discharged from the perforated plate is correspondingly directed by the impinging flow nozzle.

In useful fashion, the strands of melt material are impinged when discharged from the perforated plate in substantially a cross-flow or substantially a counter-flow by the impinging flow fluid.

In embodiments, the impinging flow fluid can be a fluid such as heated air, or an inert gas, such as nitrogen.

The device for making granules from strands of a thermoplastic polymer melt material can have a melt-creating apparatus for producing the melt, which can be an extruder, from the thermoplastic polymer material, a perforated plate from which the thermoplastic polymer material is discharged in multiple strands, an impinging flow device with an impinging flow nozzle from which the strands are impinged with an impinging flow fluid, and a dividing device, which can be a rotating strand cutting arrangement for dividing the strands into individual granules, wherein the impinging flow device can pivot relative to the perforated plate by means of a pivoting joint in such a manner that the strands can only be impinged in the region where they are discharged from the perforated plate, and wherein the pivoting joint can be positioned in the region of the perforated plate.

In embodiments, due to the flexible orientation of the impinging flow device, a targeted impingement of the strands in the region of the perforated plate is possible in a manner that undesirable deposits can be purposefully avoided or removed.

In embodiments, the pivoting joint has a pivoting range α such that the strands of melt material can be impinged particularly effectively in the region of the perforated plate in cross-flow or in counter-flow.

In embodiments, the pivoting joint preferably also has an axis of rotation located at a distance R from the region where the strands are discharged.

In embodiments, the impinging flow nozzle can be a slot nozzle and the perforated plate can have individual nozzle apertures from which strands of melt material are discharged, wherein the individual nozzle apertures are each located the same distance from the slot nozzle, and wherein this distance is preferably in the range from 5 mm to 30 mm and more preferably in the range from 10 mm to 25 mm. This provides for uniform flow conditions of the impingement, with the result that breaking of strands of melt material can be efficiently avoided.

In general, all advantages and features that are specified in connection with the method according to the invention are also applicable, insofar as they can be used therewith, to the device according to the invention, and vice versa. The device according to the invention can carry out the method according to the invention.

The invention is explained in detail below using the attached FIGURE by way of example.

FIG. 1 schematically shows a partially sectional view of an embodiment of the device according to the invention.

FIG. 1 schematically shows a partially sectional view of an embodiment of the device for making granules from strands of a thermoplastic polymer melt material. The device has a melt-creating apparatus for creating the melt from the thermoplastic polymer material (not shown in FIG. 1), a perforated plate 1 with nozzle apertures 4 from which the thermoplastic polymer material is discharged in strands.

In this embodiment, the device also has an impinging flow device with an impinging flow nozzle 2 from which the strands are impinged with an impinging flow fluid, and a dividing device for dividing the strands into individual granules (not shown in FIG. 1).

According to the embodiment of the invention shown in FIG. 1, the impinging flow device is arranged to pivot relative to the perforated plate 1 by means of a pivoting joint 3 located in the region of the perforated plate 1 in such a manner that the strands of melt material can only be impinged in the region where they are discharged from the perforated plate.

In this embodiment, the pivoting joint 3 has an axis of rotation that is located at a distance R from the region where the strands are discharged and can be located in the region of the perforated plate 1 or the surface thereof. Thus the pivoting joint has a pivoting range with a pivoting angle α, which makes it possible for the strands in the region of the perforated plate 1 to be impinged in cross-flow or in counter-flow.

The impinging flow nozzle 2 can be a slot nozzle and in embodiments, the individual nozzle apertures 4 of the perforated plate 1 are each the same distance from the slot nozzle. This distance can be from 5 mm to 30 mm, and the nozzle apertures 4 and impinging flow nozzle 2 can be arranged in a straight line, correspondingly parallel to one another.

Using the device, it is possible to carry out the method according to the invention for making granules from strands of a thermoplastic polymer melt material, comprising the steps of creating and providing the melt of the thermoplastic polymer material, discharging the thermoplastic polymer material from the perforated plate 1 in strands, impinging the strands with an impinging flow fluid from the impinging flow nozzle 2, cooling the strands, and subsequently dividing the strands into individual granules.

The strands are only impinged by the impinging flow fluid during discharge from the perforated plate 1, and, as the impinging flow fluid is discharged from the impinging flow nozzle 2, the impinging flow fluid can have a temperature above the melting temperature of the polymer material and can have a discharge velocity in the range from 50 m/sec to 300 m/sec.

For example, the device according to the invention was used experimentally in the applicant's technical center, employing the method according to the invention, to produce granules of glass fiber-reinforced polyamide polymer material from a corresponding melt, wherein the nozzle width of the impinging flow nozzle, which was implemented as a slot nozzle, was 100 mm with a gap height of 0.5 mm across the entire width of the nozzle. The volume of the impinging flow fluid (in the example: heated air at a temperature of 450° C. at the impinging flow nozzle) was approximately 5 $m^3/h$ to approximately 8 $m^3/h$, so that deposits were appropriately removed or were not able to form at all.

While these embodiments have been described with emphasis on the embodiments, it should be understood that within the scope of the appended claims, the embodiments might be practiced other than as specifically described herein.

What is claimed is:

1. A device for making granules from strands of a melt of a thermoplastic polymer material, wherein the device comprises:
   a. a melt-creating apparatus for producing the melt from the thermoplastic polymer material, having:
      (i) a perforated plate from which the thermoplastic polymer material is discharged in multiple strands;
      (ii) an impinging flow device comprising an impinging flow nozzle from which the multiple strands are impinged with an impinging flow fluid; and
      (iii) a dividing device for dividing the multiple strands into individual granules;
   wherein the impinging flow device is arranged to pivot relative to the perforated plate by means of a pivoting joint, located in the region of the perforated plate, in such a manner that the multiple strands are impinged in the region where they are discharged from the perforated plate.

2. The device of claim 1, further comprising at least one of the following:

a. the pivoting joint has a pivoting range such that the multiple strands can be impinged in the region of the perforated plate in cross-flow or in counter-flow;
b. the pivoting joint has an axis of rotation located at a distance from the region where the multiple strands are discharged; or
c. the impinging flow nozzle is a slot nozzle and the perforated plate has individual nozzle apertures from which the multiple strands are discharged, wherein the individual nozzle apertures are each 5 mm to 30 mm away from the slot nozzle.

3. The device of claim 1, further comprising at least two of the following:
   a. the pivoting joint is located in the region of the perforated plate;
   b. the pivoting joint has a pivoting range such that the multiple strands can be impinged in the region of the perforated plate in cross-flow or in counter-flow;
   c. the pivoting joint has an axis of rotation located at a distance from the region where the multiple strands are discharged; or
   d. the impinging flow nozzle is a slot nozzle and the perforated plate has individual nozzle apertures from which the multiple strands are discharged, wherein the individual nozzle apertures are each 5 mm to 30 mm away from the slot nozzle.

4. The device of claim 1, further comprising at least three of the following;
   a. the pivoting joint is located in the region of the perforated plate;
   b. the pivoting joint has a pivoting range such that the multiple strands can be impinged in the region of the perforated plate in cross-flow or in counter-flow;
   c. the pivoting joint has an axis of rotation located at a distance from the region where the multiple strands are discharged; or
   d. the impinging flow nozzle is a slot nozzle and the perforated plate has individual nozzle apertures from which the multiple strands are discharged, wherein the individual nozzle apertures are each 5 mm to 30 mm away from the slot nozzle.

5. The device of claim 1, further comprising the following:
   a. the pivoting joint is located in the region of the perforated plate;
   b. the pivoting joint has a pivoting range such that the multiple strands can be impinged in the region of the perforated plate in cross-flow or in counter-flow;
   c. the pivoting joint has an axis of rotation located at a distance from the region where the multiple strands are discharged; and
   d. the impinging flow nozzle is a slot nozzle and the perforated plate has individual nozzle apertures from which the multiple strands are discharged, wherein the individual nozzle apertures are each 5 mm to 30 mm away from the slot nozzle.

* * * * *